(12) United States Patent
Adkisson et al.

(10) Patent No.: US 7,430,696 B2
(45) Date of Patent: Sep. 30, 2008

(54) ZEROING CIRCUIT FOR PERFORMANCE COUNTER

(75) Inventors: Richard W. Adkisson, Dallas, TX (US); Tyler Johnson, Plano, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1133 days.

(21) Appl. No.: 10/635,079

(22) Filed: Aug. 6, 2003

(65) Prior Publication Data

US 2004/0236992 A1 Nov. 25, 2004

Related U.S. Application Data

(60) Provisional application No. 60/469,180, filed on May 9, 2003.

(51) Int. Cl.
*G01R 31/28* (2006.01)
*G06F 11/00* (2006.01)

(52) U.S. Cl. ........................ 714/724; 714/706
(58) Field of Classification Search ................ 714/724
See application file for complete search history.

(56) References Cited

U.S. PATENT DOCUMENTS

| | | | |
|---|---|---|---|
| 5,644,578 A | * | 7/1997 | Ohsawa ...................... 714/719 |
| 5,651,112 A | | 7/1997 | Matsuno et al. |
| 5,796,633 A | | 8/1998 | Burgess et al. |
| 5,835,702 A | | 11/1998 | Levine et al. |
| 5,881,223 A | | 3/1999 | Agrawal et al. |
| 5,887,003 A | * | 3/1999 | Ranson et al. .............. 714/736 |
| 6,112,317 A | | 8/2000 | Berc et al. |
| 6,112,318 A | | 8/2000 | Jouppi et al. |
| 6,360,337 B1 | | 3/2002 | Zak et al. |
| 6,546,359 B1 | | 4/2003 | Week |

* cited by examiner

*Primary Examiner*—Jacques Louis-Jacques
*Assistant Examiner*—John J. Tabone, Jr.

(57) ABSTRACT

In one embodiment, the invention is directed to a zeroing circuit for a general purpose performance counter ("GPPC") connected to a bus carrying debug data. The zeroing circuit comprises logic for zeroing out a specified number of most significant bits ("MSBs") of a selected portion of the debug data based on a mask generated by a mask generator block. A selection control signal provided to the mask generator block is operable to be decoded to a particular mask.

23 Claims, 5 Drawing Sheets

FIG. 4 szero [210]      zmask [7:0]

ZEROING CIRCUIT FOR PERFORMANCE COUNTER

PRIORITY UNDER 35 U.S.C. §119(e) & 37 C.F.R. §1.78

This nonprovisional application claims priority based upon the following prior United States provisional patent application entitled: "General Purpose Counters for Performance, Debug and Coverage," Application No. 60/469,180, filed May 9, 2003, in the name(s) of Richard W. Adkisson and Tyler J. Johnson, which is hereby incorporated by reference.

CROSS-REFERENCE TO RELATED APPLICATIONS

This application is related to U.S. patent application Ser. No. 10/635,371, entitled COVERAGE CIRCUIT FOR PERFORMANCE COUNTER; U.S. patent application Ser. No. 10/635,372, entitled COVERAGE DECODER CIRCUIT FOR PERFORMANCE COUNTER; U.S. patent application Ser. No. 10/635,103, entitled DATA SELECTION CIRCUIT FOR PERFORMANCE COUNTER; U.S. patent application Ser. No. 10/635,083, entitled GENERAL PURPOSE PERFORMANCE COUNTER; U.S. patent application Ser. No. 10/635,373, entitled MATCH CIRCUIT FOR PERFORMANCE COUNTER; and U.S. patent application Ser. No. 10/635,369, entitled INCREMENT/DECREMENT CIRCUIT FOR PERFORMANCE COUNTER, all of which were filed on Aug. 6, 2003 and which are hereby incorporated by reference in their entirety.

BACKGROUND

Increasing demand for computer system scalability (i.e., consistent price and performance and higher processor counts) combined with increases in performance of individual components continues to drive systems manufacturers to optimize core system architectures. One such systems manufacturer has introduced a server system that meets these demands for scalability with a family of application specific integrated circuits ("ASICs") that provide scalability to tens or hundreds of processors, while maintaining a high degree of performance, reliability, and efficiency. The key ASIC in this system architecture is a cell controller ("CC"), which is a processor-I/O-memory interconnect and is responsible for communications and data transfers, cache coherency, and for providing an interface to other hierarchies of the memory subsystem.

In general, the CC comprises several major functional units, including one or more processor interfaces, memory units, I/O controllers, and external crossbar interfaces all interconnected via a central data path ("CDP"). Internal signals from these units are collected on a performance monitor bus ("PMB"). One or more specialized performance counters, or performance monitors, are connected to the PMB and are useful in collecting data from the PMB for use in debugging and assessing the performance of the system of which the CC is a part. Currently, each of the performance counters is capable of collecting data from only one preselected portion of the PMB, such that the combination of all of the performance counters together can collect all of the data on the PMB. While this arrangement is useful in some situations, there are many situations in which it would be advantageous for more than one of the performance counters to access data from the same portion of the PMB. Additionally, it would be advantageous to be able to use the performance counters in the area of determining test coverage. These applications are not supported by the state-of-the-art performance counters.

SUMMARY

In one embodiment, the invention is directed to a zeroing circuit for a general purpose performance counter ("GPPC") connected to a bus carrying debug data. The zeroing circuit comprises logic for zeroing out a specified number of most significant bits ("MSBs") of a selected portion of the debug data based on a mask generated by a mask generator block. A selection control signal provided to the mask generator block is operable to be decoded to a particular mask.

DETAILED DESCRIPTION OF THE DRAWINGS

In the drawings, like or similar elements are designated with identical reference numerals throughout the several views thereof, and the various elements depicted are not necessarily drawn to scale.

Figure 1:
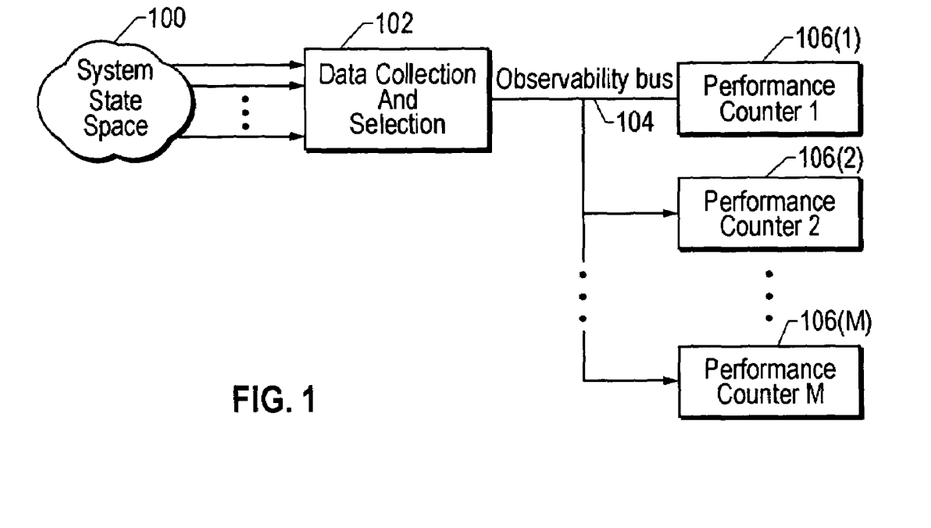
FIG. 1 is a block diagram illustrating general purpose data collection in a logic design.

FIG. 1 is a block diagram of general purpose data collection in a logic design. As shown in FIG. 1, the state space 100 of a logic design under consideration is driven to data collection and selection logic 102. The logic 102 drives a D-bit data collection, or observability, bus 104 carrying a D-bit debug_bus signal to a plurality of performance counters 106 (1)-106(M). Details of one embodiment of the logic 102 and bus 104 are provided in U.S. patent application Ser. No. 10/402,092, filed Mar. 28, 2003, entitled A BUS INTERFACE MODULE; and U.S. patent application Ser. No. 10/402,034, filed Mar. 28, 2003, entitled AN INTEGRATED CIRCUIT, each of which is hereby incorporated by reference in its entirety.

In one embodiment, D is equal to 80, M is equal to 12, and performance counters 106(1)-106(M−1) are general purpose performance counters, while the remaining performance counter 106(M) increments on every clock cycle. As will be illustrated below, the general purpose performance counters are "general purpose" in that each of them is capable of accessing any bit of the 80-bits on the bus 104; moreover, all of them may access the same block of bits and do the same or different performance calculations thereon.

Figure 2:
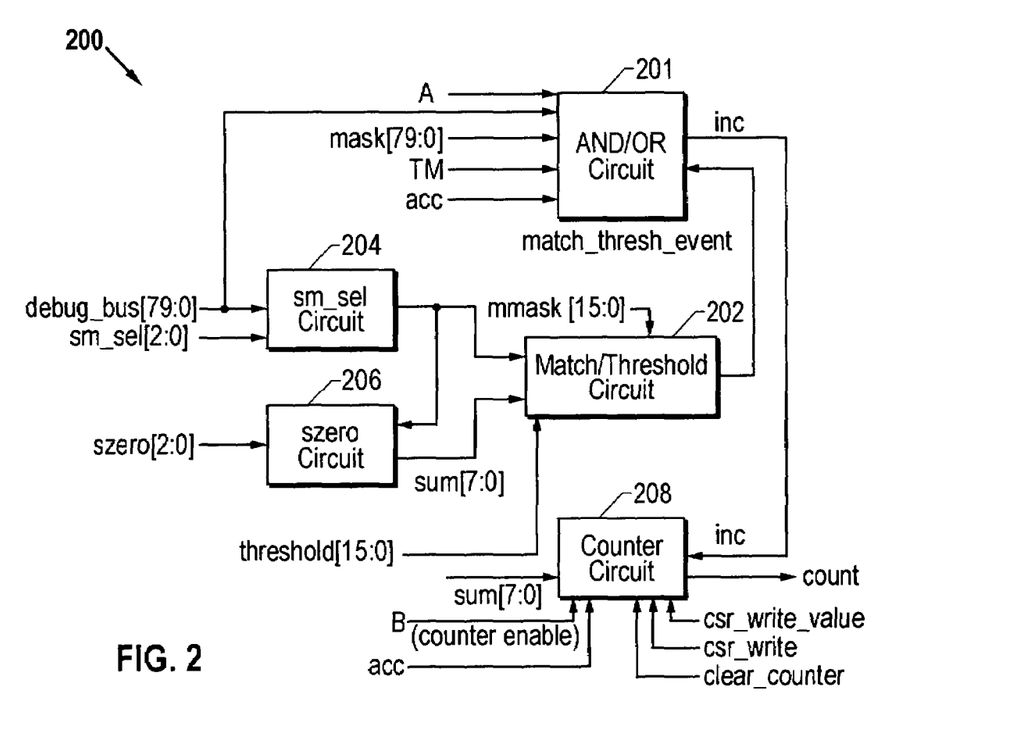
FIG. 2 is a block diagram of a general purpose performance counter according to one embodiment.

FIG. 2 is a block diagram of a general purpose performance counter 200, which is identical in all respects to each of the performance counters 106(1)-106(M−1) (FIG. 1), in accordance with one embodiment. As will be described in greater detail below, the performance counter 200 can be used to perform general purpose operations to extract performance, debug, or coverage information with respect to any system under test (SUT) such as, for instance, the system state space 100 shown in FIG. 1. The performance counter 200 includes an AND/OR circuit 201, a match/threshold circuit 202, an sm_sel circuit 204, an szero circuit 206, and a counter circuit 208.

Figure 3:
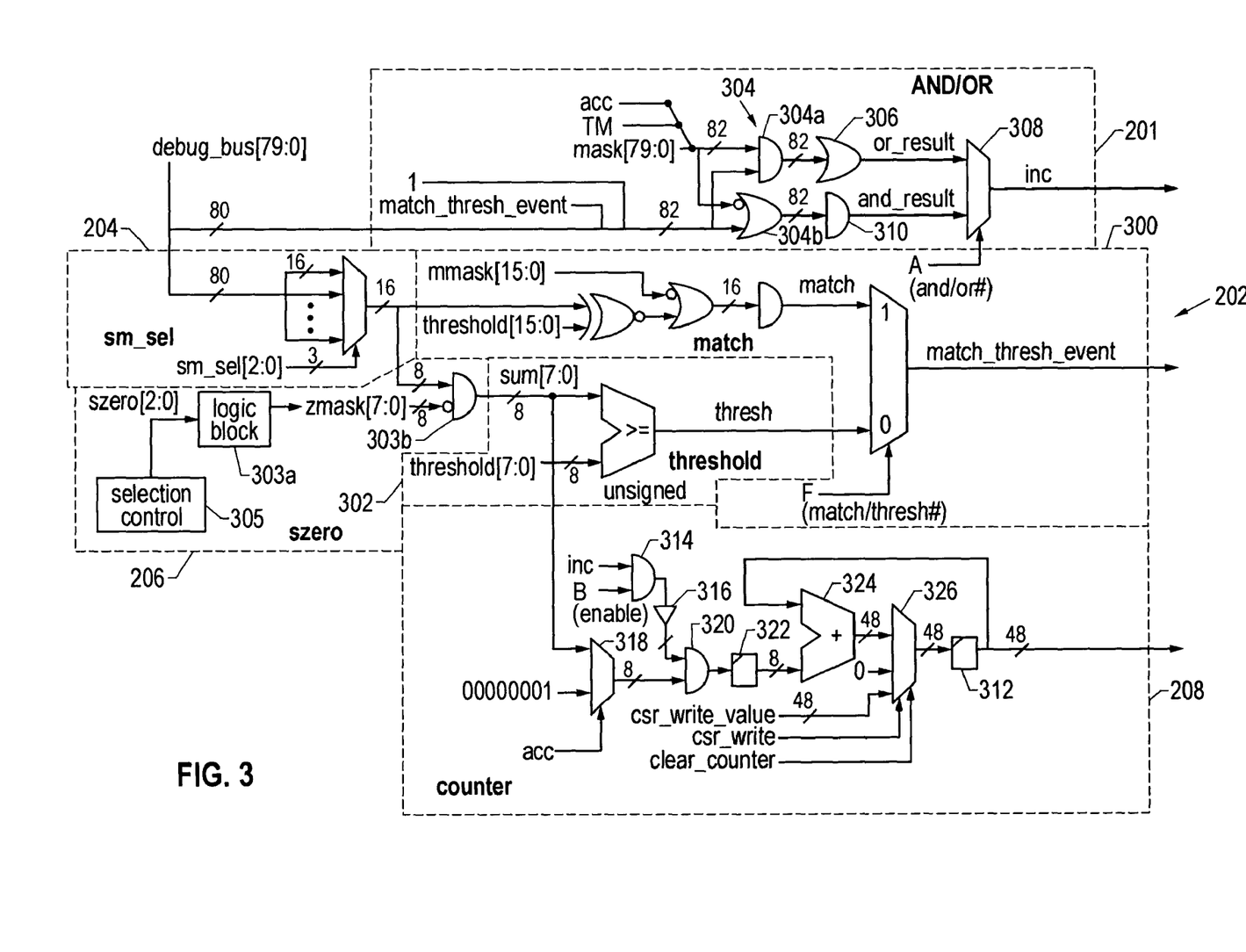
FIG. 3 is a more detailed block diagram of the general purpose performance counter of FIG. 2.

In general, the AND/OR circuit 201 enables access to all of the bits of the debug_bus signal coming into the performance counter 200 via the observability bus 104. In one embodiment, as illustrated in FIGS. 2 and 3, debug_bus is an 80-bit signal. When the AND/OR circuit 201 is operating in AND mode, the circuit activates an "inc" signal to the counter circuit 208 if all of the bits of the debug_bus signal plus two bits that are appended thereto, as will be described in greater detail below, that are of interest (as indicated by the value of an 80-bit "mask" plus two bits that are appended thereto as will be described in greater detail below) are set. When the AND/OR circuit 201 is operating in OR mode, the circuit activates the inc signal to the counter circuit 208 if any one or more of the bits of the debug_bus signal plus the two additional bits that are of interest (as indicated by the value the mask plus the two additional bits) are set.

When the match/threshold circuit 202 is operating in "match" mode, a match portion 300 (FIG. 3) of the circuit activates a match_thresh_event signal to the AND/OR circuit 201 when an N-bit portion of the debug_bus signal selected as described in greater detail below with reference to the sm_sel circuit 204 and the szero circuit 206 matches an N-bit threshold for all bits selected by a match mask ("mmask"). In particular, for all bits of the selected N-bit debug bus signal portion that are "don't cares", the corresponding bit of mmask will be set to 0; conversely, for all bits of the selected N-bit debug bus signal portion that are not "don't cares", the corresponding bit of mmask will be set to 1. The match_thresh_event signal is one of the two bits appended to the debug_bus signal. In the illustrated embodiment, N is equal to 16.

When the match/threshold circuit 202 is operating in "threshold" mode, a threshold portion 302 (FIG. 3) of the circuit 202 activates the match_thresh_event signal to the AND/OR circuit 201 when an S-bit portion of the debug_bus signal selected and zeroed as described in greater detail below with reference to the sm_sel circuit 204 and the szero circuit 206 is equal to or greater than the threshold. In the illustrated embodiment, S is equal to N/2, or 8.

Additional details regarding operation of the match/threshold circuit 202 are provided in U.S. patent application Ser. No. 10/635,373, filed Aug. 6, 2003, entitled MATCH CIRCUIT FOR PERFORMANCE COUNTER.

The sm_sel circuit 204 selects an N-bit portion of the debug_bus signal aligned on a selected 10-bit block boundary into both the match portion 300 and the threshold portion 302 (FIG. 3) of the match/threshold circuit 202 and to a sum input of the counter circuit 208. As previously stated, in the illustrated embodiment, N is equal to 16. Additional details regarding the operation of the sm_sel circuit 204 are provided in U.S. patent application Ser. No. 10/635,103, filed Aug. 6, 2003, entitled DATA SELECTION CIRCUIT FOR PERFORMANCE COUNTER.

The szero circuit 206 zeroes out none or all but one of S bits aligned on a selected 10-bit block boundary into the threshold portion 302 of the match/threshold circuit 202 and the sum input of the counter circuit 208. The szero circuit 206 comprises a mask generating zero circuit 303a, which is illustrated in greater detail with reference to FIGS. 6 and 7 below, for outputting a zmask[7:0] signal corresponding to a szero [2:0] control signal input thereto, as described in greater detail below with reference to FIG. 5. In one embodiment, a selection control block 305, such as, e.g., a control status register or CSR, may be used to provide the szero control signal having a suitable number of bits. The inverted value of zmask[7:0] is bit-wise ANDed with the output of the sm_sel circuit 204 via an AND circuit represented in FIG. 3 by an AND gate 303b. In the illustrated embodiment, S is equal to eight. The selected 10-bit block boundary is identified by the value of a three-bit control signal sm_sel input to the sm_sel circuit 204. The szero circuit 206 will be described in greater detail below with reference to FIGS. 5-7.

In one embodiment, each general purpose performance counter, such as the performance counter 200, is 48 bits plus overflow. The performance counter 200 is general purpose in that it looks at all D bits of the debug_bus signal for an event mask plus two extra events, eight separate selections of 16 bits for the match compare operation and eight separate selections of eight bits for the threshold compare and the accumulate operations. The eight bits for the threshold compare and the accumulate operations are the bottom eight bits of the 16 bits selected for the match compare operation. Those 16 bits are aligned to 10 slot boundaries as shown in an exemplary mapping arrangement illustrated in FIG. 4.

Figure 4:
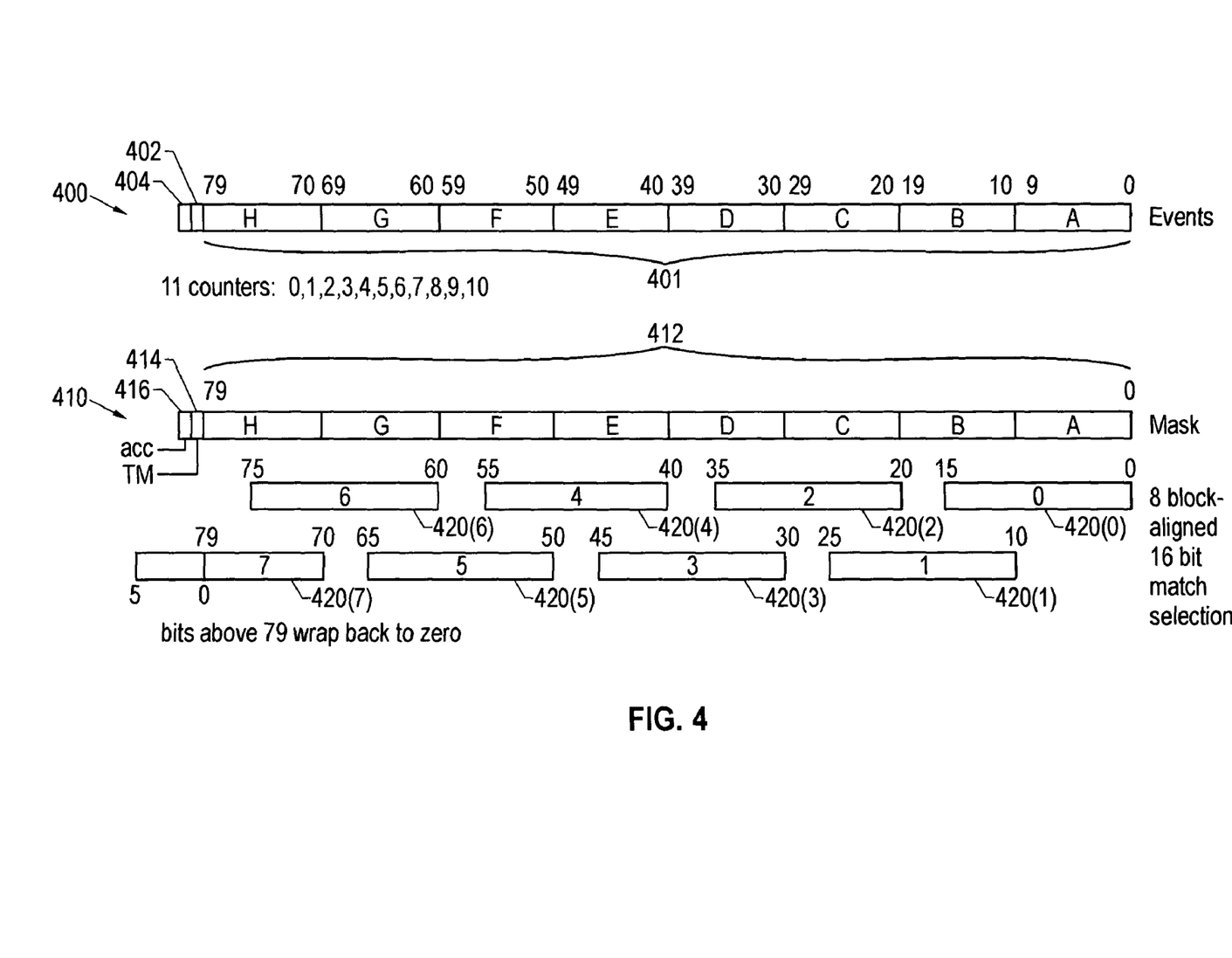
FIG. 4 illustrates a method in which signals are mapped from an observabilty bus to a performance counter in accordance with one embodiment.

In FIG. 4, an events signal 400 comprises the debug_bus signal, designated in FIG. 4 by reference numeral 401, the match_threshold_event signal, designated by reference numeral 402 and a logic 1 bit, designated by reference numeral 404. The debug_bus signal 401 comprises bits [79:0] of the events signal 400; the match_threshold_event signal 402 comprises bit [80] of the events signal, and the logic 1 bit 404 comprises bit [81] of the events signal.

As best illustrated in FIG. 3, the events signal 400 (i.e., the debug_bus signal with the match_threshold_event signal and the logic 1 appended thereto) are input to a first logic stage 304 of the AND/OR circuit 201 for purposes that will be described in greater detail below.

Referring again to FIG. 4, a composite mask signal 410 comprises an 80-bit mask signal, designated by a reference numeral 412, a match_threshold_event mask ("TM") bit, designated by reference numeral 414, and an accumulate bit ("acc"), designated by reference numeral 416. The mask signal 412 comprises bits [79:0] of the composite mask signal 410; the TM bit 414 comprises bit [80] of the composite mask signal, and the acc bit 416 comprises bit [81] of the composite mask signal. As best illustrated in FIG. 3, each bit of the composite mask 410 (i.e., the mask signal with the TM and acc bits appended thereto) is input to the first logic stage 304 of the AND/OR circuit 201 for purposes that will be described in greater detail below.

Continuing to refer to FIG. 4, eight 10-bit-block-aligned 16-bit match selections are respectively designated by reference numerals 420(0)-420(7). In particular, the selection 420 (0) comprises bits [0:15]; the selection 420(1) comprises bits [10:25]; the selection 420(2) comprises bits [20:35]; the selection 420(3) comprises bits [30:45]; the selection 420(4) comprises bits [40:55]; the selection 420(5) comprises bits [50:65]; the selection 420(6) comprises bits [60:75]; and the selection 420(7) comprises bits [70:5] (bits above 79 wrap back to zero.

Referring again to FIG. 3, the first logic stage 304 comprises an AND portion, represented by an AND gate 304a, for bit-wise ANDing the events signal 400 with the composite mask signal 410, and an OR portion, represented by an OR gate 304b, for bit-wise ORing the inverse of the composite mask signal 410 with the events signal 400. It will be recognized that, although represented in FIG. 3 as a single two-input AND gate 304a, the AND portion of the first logic stage 304 actually comprises 82 two-input AND gates. Similarly, the OR portion of the first logic stage 304 comprises 82 two-input OR gates identical to the OR gate 304b.

The outputs of the AND portion of the first logic stage 304 are input to an 82-input OR gate 306, the output of which is input to one input of a two-input MUX 308 as an "or_result". Similarly, the outputs of the OR portion of the first logic stage 304 are input to an 82-input AND gate 310, the output of which is input to the other input of the MUX 308 as an "and_result". A control signal ("and/or#") from a CSR (not shown) controls whether the AND/OR circuit functions in AND mode, in which case the and_result is output from the MUX 308 as the inc signal, or in OR mode, in which case the or_result is output from the MUX as the inc signal.

As a result, when the AND/OR circuit 201 is operating in the AND mode, the inc signal comprises the and_result signal and will be activated when all of the bits of the events signal 400 that are of interest as specified by the composite mask 410 are set. When the AND/OR circuit 201 is operating in OR mode, the inc signal comprises the or_result signal and will be activated when any one of the bits of the events signal 400 that are of interest as specified by the composite mask 410 is set.

The acc bit 416 of the composite mask 410 is CSR-settable. Setting the TM bit 414 in the composite mask 410 designates the match_thresh_event signal in the events signal as a bit of interest; not setting the TM bit in the composite mask will cause the value of the match_thresh_event signal in the events signal 400, and hence the result of any match or threshold operation performed by the match/threshold circuit 202, to be ignored.

Continuing to refer to FIG. 3, the operation of an embodiment of the counter circuit 208 will be described in greater detail. The counter circuit 208 is an X bit counter that can hold, increment by one, add S bits, clear, or load a value into a count value register 312. Other processing may also occur in order to read the value of the register 312. In the embodiment illustrated in FIG. 3, X is equal to 48. Counter circuit 208 operation is enabled by setting a counter enable signal B, which comprises one input of a two-input AND gate 314. The other input of the AND gate 314 is connected to receive the inc signal from the AND/OR circuit 201. Accordingly, when the counter circuit 208 is enabled and the inc signal is activated, a logic one is output from the AND gate 314. In any other case, the output of the AND gate 314 will be a logic zero. The output of the AND gate 314 is replicated by an 8× replicator 316 and the resulting 8-bit signal is bit-wise ANDed with an 8-bit signal output from a MUX circuit 318. The inputs to the MUX circuit 318 are the sum[7:0] signal output from the szero circuit 206 and an 8-bit signal the value of which is [00000001]. The sum[7:0] signal will be output from the MUX circuit 318 when the acc signal is activated; otherwise, the [00000001] signal will be output from the MUX circuit.

An AND circuit, represented by an AND gate 320, bit-wise ANDs the signals output from the replicator 316 and from the MUX circuit 318. The resulting 8-bit signal is input to a register 322. An adder 324 adds the 8-bit signal stored in the register 322 to the 48-bit sum stored in the count value register 312. The new sum output from the adder 324 is input to a MUX circuit 326. Two other sets of inputs to the MUX circuit 326 are connected to a logic zero and a csr_write_value, respectively. When a csr_write enable signal to the MUX circuit 326 is activated, the value of csr_write_value is output from the MUX circuit 326 and written to the count value register 312. In this manner, a value can be loaded into the count value register 312. Similarly, when the clear_counter signal is asserted, 48 zero bits are output from the MUX circuit 326 to the count value register 312, thereby clearing the register.

If neither the csr_write signal nor the clear_counter signal is asserted and the acc signal is asserted, the output of the adder 324 is written to the count value register 312, thereby effectively adding S bits (i.e., the value of the sum[7:0] signal) to the previous value of the count value register 312. Not enabling the counter circuit 208 results in the count value register 312 being held at its current value. Finally, to increment the value of the count value register 312 by one, the counter circuit 208 must be enabled, the inc signal must be asserted, and the acc signal must not be asserted.

As described in detail above, FIG. 4 illustrates that the entire data collection bus 104 (FIG. 1) is available for all of the performance counters, each being represented by the performance counter 200, making them general purpose. All D bits of the debug_bus signal can be used by the AND/OR circuit 201. N bits aligned on block boundaries can be selected by the sm_sel circuit 206, enabling full coverage of the observabilty bus 104.

Figure 5:
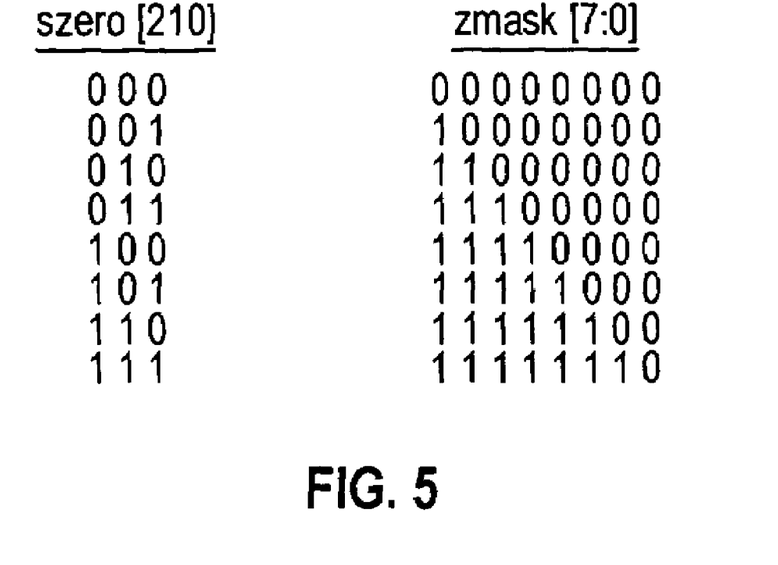
FIG. 5 is a truth table associated with one embodiment of an szero circuit of the performance counter of FIG. 2.

Returning to the discussion of the szero circuit 206, FIG. 5 is a truth table associated with the mask generating zero circuit 303a showing a corresponding value of zmask[7:0] for each value of szero[2:0]. For example, when szero[2:0] is 000, the value of zmask[7:0] is 00000000; when szero[2:0] is 001, the value of zmask[7:0] is 10000000; when szero[2:0] is 010, the value of zmask[7:0] is 11000000; when szero[2:0] is 011, the value of zmask[7:0] is 11100000; when szero[2:0] is 100, the value of zmask[7:0] is 11110000; and so on. It will be noted that the decimal value of szero[2:0] indicates the number of most significant bits ("MSBs") of zmask[7:0] that are to be set equal to one. Specifically, when szero is equal to 0, all of the zmask bits are 0; when szero is equal to 1, the one MSB of zmask is set to 1, while the remaining seven bits are 0, and so on.

Figure 6:
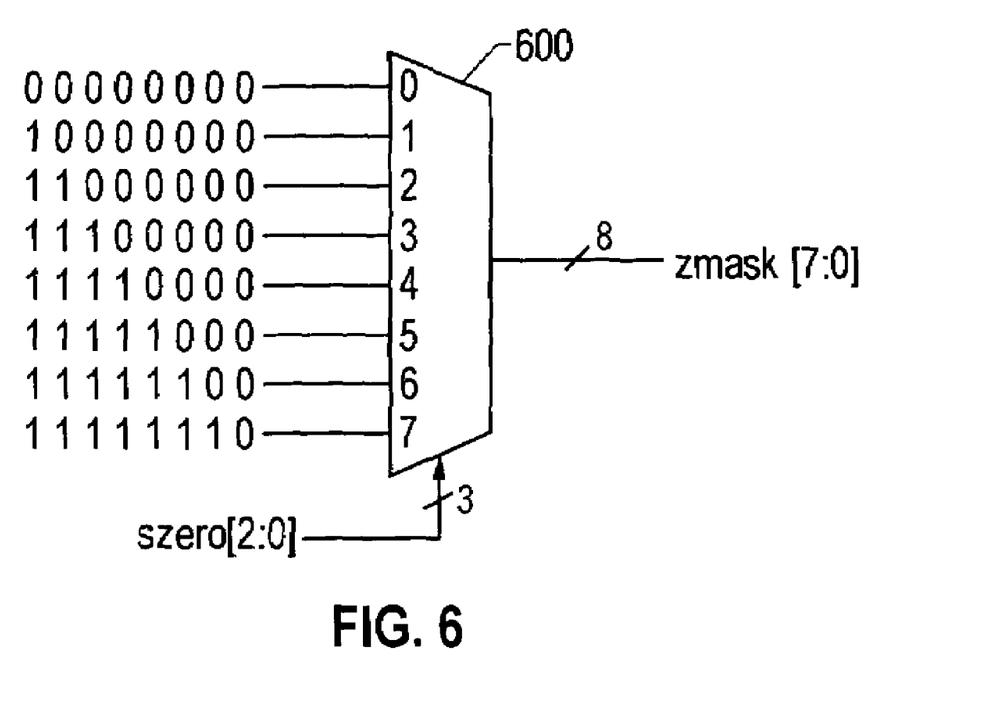
FIG. 6 is a block diagram of an embodiment of a circuit for implementing the szero circuit of FIG. 5.

FIG. 6 illustrates one embodiment of the mask generating zero circuit 303a. As illustrated in FIG. 6, the mask generator circuit 303a may be implemented as a MUX circuit 600, with the szero[2:0] used as the select signal thereto for selecting the corresponding zmask[7:0] signal input at the corresponding input of the MUX circuit 600.

Figure 7:
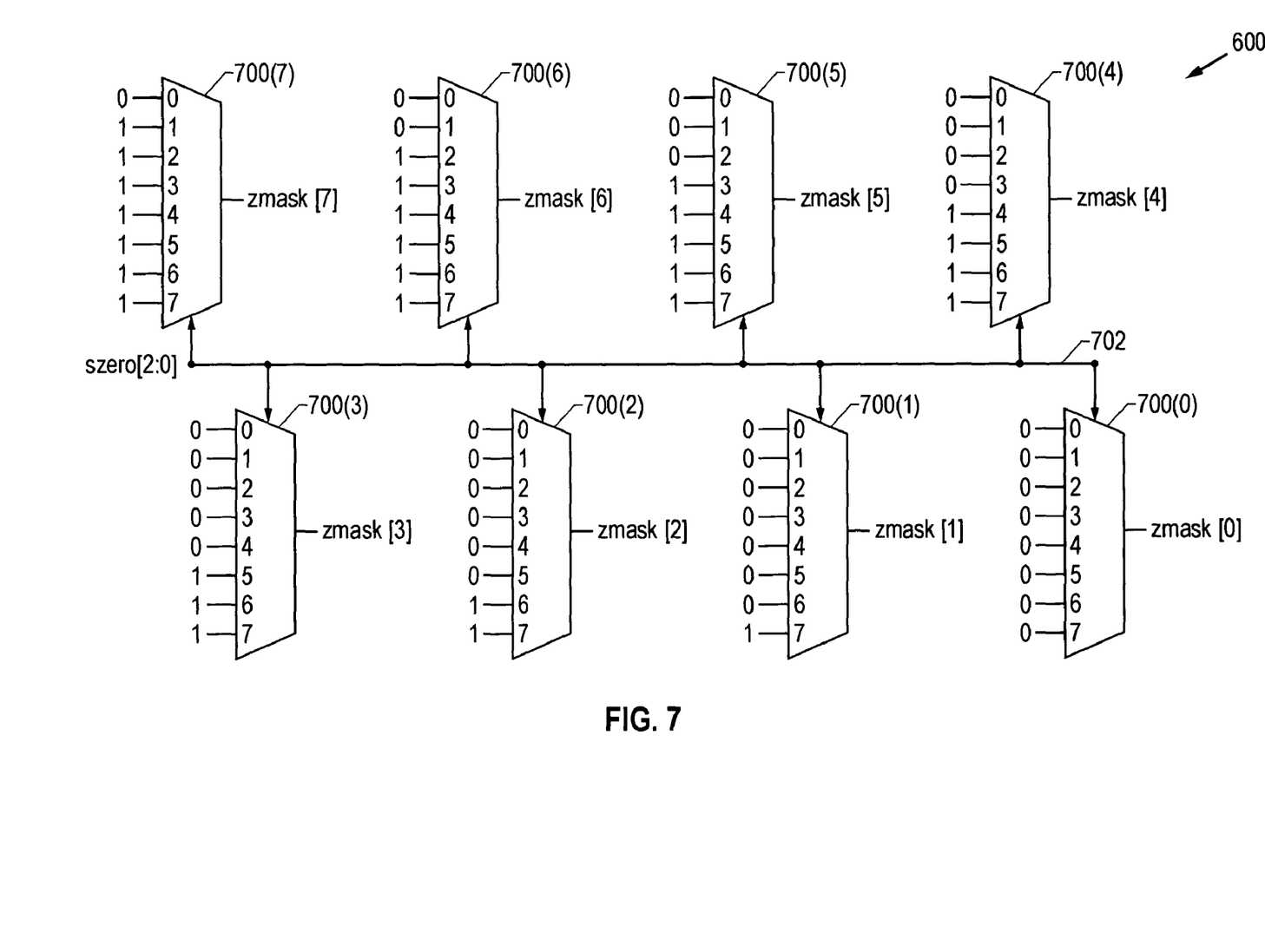
FIG. 7 is a more detailed block diagram of the circuit of FIG. 6.

FIG. 7 is a more detailed block diagram of the MUX circuit 600. In one embodiment, the MUX circuit 600 comprises eight eight-to-one MUXes 700(0)-700(7) configured as illustrated in FIG. 7. The szero[2:0] signal is input to select inputs of each of the MUXes 700(0)-700(7) via a common control path 702. As also illustrated in FIG. 7, the MSB of zmask[7:0] (i.e., zmask[7]) is output from the MUX 700(7); the LSB of zmask[7:0] (i.e., zmask[0]) is output from the MUX 700(0). The remaining bits, i.e., zmask[6], zmask[5], zmask[4], zmask[3], zmask[2], zmask[1], are output from MUXes 700(6)-700(1), respectively.

It will be recognized that there may be other ways to implement the zeroing circuit 303a and that the embodiment illustrated in FIG. 7 can be logically reduced. For example, zmask[0] will always be equal to zero; the value zmask[1] will always be equal to the value of szero[2] AND szero[1] AND szero[0]; the value of zmask[2] will always be equal to the value of szero[2] AND szero[1].

Previous performance counter designs required zero-padding in fields to the left of count fields. For example, with S=8, a three-bit count field would have required five bits to be zeroed; those bits could not be used for anything. The general purpose performance counter 200 described herein does not require zero-padding. It uses the szero circuit 206 to zero out none or all but one of the bits sent to the threshold portion 302 of the match/threshold circuit 202 and sum input of the counter circuit 208. Since these bits are only zeroed to those particular circuits, useful signals in these fields can be used by other performance counters or by the AND/OR circuit 201 or the match portion 300 of the match/threshold circuit 202 of the same performance counter.

As previously mentioned, prior art performance counter designs were not general purpose, in that they have limited range and are designed solely for performance calculations and debug of a system design. The embodiments described herein are general purpose, in that the AND/OR circuit can perform calculations on the entire range of the data collection bus 104. The embodiments also incorporate the concept of coverage. In particular, by observing specific states in a logic design, the designer can determine how much of the state space thereof is being covered by the test vectors of a test suite. The designer can thereby gauge whether more tests need to be run and what needs to be added to fully test the entire design.

An implementation of the invention described herein thus provides a general purpose performance counter. The embodiments shown and described have been characterized as being illustrative only; it should therefore be readily understood that various changes and modifications could be made therein without departing from the scope of the present invention as set forth in the following claims. For example, while the embodiments are described with reference to an ASIC, it will be appreciated that the embodiments may be implemented in other types of ICs, such as custom chipsets, Field Programmable Gate Arrays ("FPGAs"), programmable logic devices ("PLDs"), generic array logic ("GAL") modules, and the like. Furthermore, while the embodiments shown are implemented using CSRs, it will be appreciated that control signals may also be applied in a variety of other manners, including, for example, directly or may be applied via scan registers or Model Specific Registers ("MSRs"). Additionally, although specific bit field sizes have been illustrated with reference to the embodiments described, e.g., 16-bit threshold for pattern matching (where the bottom 8 bits are used for the threshold), 80-bit mask signal, 3-bit sm_sel, et cetera, various other implementations can also be had.

Accordingly, all such modifications, extensions, variations, amendments, additions, deletions, combinations, and the like are deemed to be within the ambit of the present invention whose scope is defined solely by the claims set forth hereinbelow.

What is claimed is:

1. A zeroing circuit for a general purpose performance counter ("GPPC") connected to a bus carrying debug data, the zeroing circuit comprising:
    logic for zeroing out a specified number of most significant bits ("MSBs") of a selected portion of the debug data based on a mask generated by a mask generator block, the logic for zeroing producing a result; and
    means for providing a selection control signal to the mask generator block, the selection control signal operating to select the specified number of MSBs for zeroing.

2. The zeroing circuit of claim 1 wherein the logic for zeroing out a specified number of MSBs comprises logic for ANDing the inverted value of each bit of the mask with a corresponding bit of the selected portion of the debug data.

3. The zeroing circuit of claim 2 wherein the selection control signal is three bits in length.

4. The zeroing circuit of claim 2 wherein the mask generator block is implemented using a plurality of multiplexers, the selection control signal operating to select inputs of each of the multiplexers.

5. The zeroing circuit of claim 2 wherein the logic for ANDing comprises an AND circuit.

6. The zeroing circuit of claim 5 wherein the AND circuit comprises a plurality of 2-input AND gates.

7. The zeroing circuit of claim 6 wherein each of the 2-input AND gates comprises an inverter input connected to receive a bit of the mask and an input connected to receive a corresponding bit of the selected portion of the debug data.

8. The zeroing circuit of claim 1 wherein the mask and the selected portion of the debug data are each S-bits in length.

9. The zeroing circuit of claim 8 wherein S is equal to eight.

10. A zeroing circuit for a general purpose performance counter ("GPPC") connected to a bus carrying debug data, the zeroing circuit comprising:
    means for providing a signal specifying a number of most significant bits ("MSBs") of a selected portion of the debug data to be zeroed out; and
    means for zeroing out the specified number of MSBs of the selected portion of the debug data based on the signal to form a result.

11. The zeroing circuit of claim 10 further comprising:
    means for creating a mask, wherein a value of a control signal input to the means for creating a mask specifies a number of the MSBs of the mask that are to be set to one; and
    means for ANDing the inverted value of each bit of the mask with a corresponding bit of the selected portion of the debug data.

12. The zeroing circuit of claim 11 wherein the control signal is three bits in length.

13. The zeroing circuit of claim 11 wherein the means for creating a mask is implemented using a plurality of multiplexers, wherein the control signal is input to select inputs of each of the multiplexers.

14. The zeroing circuit of claim 11 wherein the means for ANDing comprises an AND circuit.

15. The zeroing circuit of claim 14 wherein the AND circuit comprises a plurality of 2-input AND gates.

16. The zeroing circuit of claim 15 wherein each of the 2-input AND gates comprises an inverter input connected to receive a bit of the mask and an input connected to receive a corresponding bit of the selected portion of the debug data.

17. The zeroing circuit of claim 10 wherein the mask and the selected portion of the debug data are each S-bits in length.

18. The zeroing circuit of claim 17 wherein S is equal to eight.

19. A method of implementing a zeroing circuit for a general purpose performance counter ("GPPC") connected to a bus carrying debug data, the method comprising:
    generating a control signal indicative of a number of most significant bits ("MSBs") of a selected portion of the debug data to be set to zero;
    creating an S-bit mask based on the control signal; and
    generating an S-bit zeroed data signal using the S-bit mask, wherein the S-bit zeroed data signal comprises the selected portion of the debug data with the indicated number of MSBs set to zero.

20. The method of claim 19 wherein a number of the MSBs of the mask that are set to one is equal to the value of the control signal, with the remaining least significant bits ("LSBs") set to zero.

21. The method of claim 19 wherein the operation of generating an S-bit zeroed data signal comprises ANDing each bit of the inverse of the mask with a bit of the selected debug data portion, the result of each AND operation giving rise to a corresponding bit of the zeroed data signal.

22. The method of claim 21 wherein S is equal to eight.

23. The method of claim 19 wherein the control signal is three bits in length.

* * * * *

UNITED STATES PATENT AND TRADEMARK OFFICE
CERTIFICATE OF CORRECTION

| | |
|---|---|
| PATENT NO. | : 7,430,696 B2 |
| APPLICATION NO. | : 10/635079 |
| DATED | : September 30, 2008 |
| INVENTOR(S) | : Richard W. Adkisson et al. |

It is certified that error appears in the above-identified patent and that said Letters Patent is hereby corrected as shown below:

In column 1, line 31, below "reference in their entirety." insert -- Related subject matter disclosed in the following commonly owned co-pending U. S. patent applications: (i) A BUS INTERFACE MODULE, filed March 28, 2003; Application No. 10/402,092; and (ii) AN INTEGRATED CIRCUIT, filed March 28, 2003; Application No. 10/402,034, is hereby incorporated by reference. --.

Signed and Sealed this

Thirtieth Day of December, 2008

JON W. DUDAS
*Director of the United States Patent and Trademark Office*